(12) United States Patent
Huang et al.

(10) Patent No.: US 9,016,986 B2
(45) Date of Patent: Apr. 28, 2015

(54) TRANSLOCATION-SIMULATING LOADING APPARATUS FOR GEAR GRINDING MACHINE WITH SHAPED GRINDING WHEEL AND DETECTION METHOD FOR STIFFNESS DISTRIBUTION

(75) Inventors: Yumei Huang, Xi'an (CN); Yao Liu, Xi'an (CN); Feng Gao, Xi'an (CN); Li Zhang, Xi'an (CN)

(73) Assignee: Xi'an University of Technology, Xi'an (CN)

( * ) Notice: Subject to any disclaimer, the term of this patent is extended or adjusted under 35 U.S.C. 154(b) by 275 days.

(21) Appl. No.: 13/811,221

(22) PCT Filed: Aug. 26, 2011

(86) PCT No.: PCT/CN2011/079018
§ 371 (c)(1),
(2), (4) Date: Jan. 18, 2013

(87) PCT Pub. No.: WO2012/025065
PCT Pub. Date: Mar. 1, 2012

(65) Prior Publication Data
US 2013/0115857 A1      May 9, 2013

(30) Foreign Application Priority Data
Aug. 27, 2010   (CN) .......................... 2010 1 0264201

(51) Int. Cl.
*B23F 9/10*    (2006.01)
*B23Q 11/00*   (2006.01)
(Continued)

(52) U.S. Cl.
CPC .............. *B23Q 11/001* (2013.01); *B23F 17/00* (2013.01); *B23F 9/025* (2013.01); *B23F 23/12* (2013.01); *B23Q 17/22* (2013.01); *G01M 13/025* (2013.01); *B23F 23/10* (2013.01); *B23F 1/02* (2013.01); *B23F 5/04* (2013.01); *G01M 13/021* (2013.01)

(58) Field of Classification Search
CPC ........ B23F 9/10; B23F 9/025; B23F 23/1218; B23F 17/00
USPC ...................................... 409/25–30
See application file for complete search history.

(56) References Cited

U.S. PATENT DOCUMENTS 4,981,402 A * 1/1991 Krenzer et al. ................. 409/26
5,080,537 A * 1/1992 Takano et al. .................. 409/29
(Continued)

FOREIGN PATENT DOCUMENTS

CN    201037803 Y    3/2008
CN    101480734 A    7/2009
(Continued)

*Primary Examiner* — Lisa Caputo
*Assistant Examiner* — Jonathan Dunlap
(74) *Attorney, Agent, or Firm* — Novick, Kim & Lee, PLLC; Sang Ho Lee

(57) ABSTRACT

A translocation-simulating loading apparatus for the gear grinding machine with the shaped grinding wheel is provided. The apparatus includes a load-receiving test piece disposed on the gear grinding machine with the shaped grinding wheel and a load-exerting component for use in loading simulation. The gear grinding machine enables linear movements along the X, Y, and Z axes, a rotary movement around the Y axis, a rotary movement C around the Z axis, and a rotary movement A around the X axis. An angle α is formed between the axis L of a ball seat of the load-exerting component and the X axis direction of a Y axis component and an angle formed between the normal line of a load receiving face a and the X direction of the coordinate system of the machine tool is α. A detection method for static stiffness distribution is provided.

7 Claims, 2 Drawing Sheets

(51) Int. Cl.
  *B23F 17/00*  (2006.01)
  *B23F 9/02*  (2006.01)
  *B23F 23/12*  (2006.01)
  *B23Q 17/22*  (2006.01)
  *G01M 13/02*  (2006.01)
  *B23F 23/10*  (2006.01)
  *B23F 1/02*  (2006.01)
  *B23F 5/04*  (2006.01)

(56) References Cited

U.S. PATENT DOCUMENTS

| | | | |
|---|---|---|---|
| 5,175,962 A * | 1/1993 | Pedersen | 451/5 |
| 5,598,618 A * | 2/1997 | Aquino et al. | 29/889 |
| 5,961,260 A * | 10/1999 | Kasler et al. | 409/25 |
| 6,526,837 B1 | 3/2003 | Grote et al. | |
| RE38,504 E * | 4/2004 | Kasler et al. | 409/25 |
| 7,179,025 B2 * | 2/2007 | Kreh | 409/26 |
| 7,431,544 B2 * | 10/2008 | Ribbeck | 409/8 |
| 7,553,115 B2 * | 6/2009 | McGlasson et al. | 409/27 |
| 2002/0154961 A1 * | 10/2002 | Stadtfeld et al. | 409/26 |
| 2005/0025597 A1 * | 2/2005 | Klingen et al. | 409/26 |
| 2008/0056837 A1 | 3/2008 | McGlasson et al. | |

FOREIGN PATENT DOCUMENTS

| | | |
|---|---|---|
| CN | 101941102 A | 1/2011 |
| JP | 2010179396 A | 8/2010 |

* cited by examiner

TRANSLOCATION-SIMULATING LOADING APPARATUS FOR GEAR GRINDING MACHINE WITH SHAPED GRINDING WHEEL AND DETECTION METHOD FOR STIFFNESS DISTRIBUTION

TECHNICAL FIELD

The present invention belongs to the technical field of mechanical detection, and to a detection technology for static stiffness of the numerically controlled (NC) machine tool at different positions within the machining job space under the simulated load. More particularly, the present invention relates to a translocation-simulating loading apparatus for gear grinding machine with shaped grinding wheel, and the present invention also relates to a detection method for static stiffness distribution using a translocation-simulating loading for gear grinding machine with shaped grinding wheel.

BACKGROUND

Within the machining job space of a machine tool, as the position of a machining point is changed such that the load-carrying position of members of the machine tool and the magnitude of load (including force and moment) are changed, static stiffness of the machine tool is changed. Static stiffness changes at different machining positions may be described using stiffness distribution. The magnitude and distribution of the static stiffness directly affect the machining precision and the vibration characteristic of the machine tool.

The machined surface of a work piece is formed through a relative movement between a cutter and the work piece. The forming principle of the machined surface is divided into a trajectory method, a shaping method, a tangency method and a generation method. Depending on the different forming principles of the machined surface, the machine tool has a different movement function. For example, in terms of the gear grinding machine that grinds gears, the forming principle of the machined surface for the NC gear grinding machine with shaped grinding wheel employs shaping method, and thus the shape of the grinding wheel is the same as that of the tooth space of the gear; while the forming principle of the machined surface for the NC gear grinding machine with worm grinding wheel employs generation method, and thus the shape of the grinding wheel is a shape of the worm. Depending on the different types of the NC machine tool, the property of the load carried between the cutter and the work piece at the machining point, change rule of the loads at different machining positions and proportions among the loads in all directions are different, and thus simulating loading apparatuses used in various types of the NC machine tool and corresponding detection methods thereof are different.

Unlike the forming principles of the machined surface employing the trajectory method and the tangency method of a general NC turning machine and a machining center, as well as other machine tools that machine gear employing the generation method, the forming principle of the machined surface for the NC gear grinding machine with shaped grinding wheel employs the shaping method, and thus the simulating loading apparatus and corresponding detection method thereof are different from conventional apparatuses and methods.

Static stiffness test of the machine tool employs simulated load instead of cutting load. Taking NC gear grinding machine with shaped grinding wheel as an example, during machining, as position of the machining point moving in the Z, X, and C axes is changed, positions of components in the Z, X, and C axes are changed, such that both the static stiffness at one side of the spindle and the static stiffness at one side of the work bench will be varied along with change of the position of the machining point of the work piece. However, detection apparatuses and methods for static stiffness existing at home and abroad can only detect the static stiffness at one determined position, but can not detect static stiffness distribution.

SUMMARY

Technical Problem

An object of the present invention is to provide a translocation-simulating loading apparatus for gear grinding machine with shaped grinding wheel, which solves the problem in which the gear grinding machine with shaped grinding wheel in the related arts cannot detect static stiffness distribution.

Another object of the present invention is to provide a detection method for static stiffness distribution using the translocation-simulating loading for gear grinding machine with shaped grinding wheel.

TECHNICAL SOLUTION

According to an aspect of the present invention, a translocation-simulating loading apparatus for gear grinding machine with shaped grinding wheel comprises a load-receiving test piece disposed on the gear grinding machine with shaped grinding wheel and a load-exerting component for use in loading simulation, the gear grinding machine with shaped grinding wheel comprises a C axis component and a X axis component disposed on a machine tool bed, as well as a Z axis component, an A axis component, a Y axis component and a spindle component which are mounted sequentially towards a direction of the C axis component in a horizontal mounting axis of an upper section of a column of the X axis component.

The structure of the load-exerting component is as follows: a connector, a gland and a ring body are fitted coaxially on an outer circumference of a spindle of the spindle component, the connector is fixedly connected with the spindle, and the connector is fixedly connected with the gland and the ring body, a radial hole is disposed on the ring body, and a lower gasket, a force sensor, an upper gasket, a ball seat and a steel ball are sequentially disposed in the radial hole along a diameter direction outwardly, a position-limit cover is disposed at a position in which an upper portion of the ball seat contacts with the ring body and fixedly connected with the ring body, the steel ball is positioned in the ball seat and a ball cover and exposed from the ball cover, the ball cover is fixedly connected with the ball seat, and the ball seat is mounted such that an angle formed between the axis L of the ball seat and the X axis of the Y axis component is $\alpha$.

A load receiving face and a mounting face of the load-receiving test piece are planes, the mounting face of the load-receiving test piece is mounted on a work bench in the C axis component, an angle formed between the mounting face and a Y direction of a coordinate system of the machine tool is $\theta$, and an angle formed between a normal line of the load receiving face and a X direction of the coordinate system of the machine tool is $\alpha$.

According to another aspect of the present invention, a detection method for static stiffness distribution using the translocation-simulating loading for gear grinding machine with shaped grinding wheel is provided, the method relies on a translocation-simulating loading apparatus comprising a load-receiving test piece disposed on the gear grinding machine with shaped grinding wheel and a load-exerting component for use in loading simulation, the gear grinding machine with shaped grinding wheel comprises a C axis component and a X axis component disposed on a machine tool bed, as well as a Z axis component, an A axis component, a Y axis component and a spindle component which are mounted sequentially towards a direction of the C axis component in a horizontal mounting axis of an upper section of a column of the X axis component.

The structure of the load-exerting component is as follows: a connector, a gland and a ring body are fitted coaxially on an outer circumference of a spindle of the spindle component, the connector is fixedly connected with the spindle, and the connector, the gland and the ring body are fixedly connected, a radial hole is disposed on the ring body, and a lower gasket, a force sensor, an upper gasket, a ball seat and a steel ball are sequentially disposed in the radial hole along a diameter direction outwardly, a position-limit cover is disposed at a position in which an upper portion of the ball seat contacts with the ring body and fixedly connected with the ring body, the steel ball is positioned in the ball seat and a ball cover and exposed from the ball cover, the ball cover is fixedly connected with the ball seat, and the ball seat is mounted such that an angle formed between the axis L of the ball seat and the X axis direction of the Y axis component is $\alpha$, a plurality of displacement sensors are mounted on the spindle, a casing of spindle box and the C axis component; a load receiving face and a mounting face of the load-receiving test piece are planes, the mounting face of the load-receiving test piece is mounted on a work bench in the C axis component, an angle formed between the mounting face and a Y direction of a coordinate system of the machine tool is $\theta$, and an angle formed between a normal line of the load receiving face and a X direction of the coordinate system of the machine tool is $\alpha$.

The method using the above apparatus is performed through the following steps.

Step 1: determining the angle $\alpha$ according to a proportion between the simulated grinding force in Z direction and the simulated grinding force in X direction; and determining the angle $\theta$ according to a proportion between the simulated grinding force in Z direction and the simulated grinding force in Y direction.

Step 2: mounting the load-exerting component on the spindle of the spindle component, and adjusting the A axis component such that an angle formed between the Y axis of the Y axis component and the Y direction of the coordinate system of the machine tool is $\theta$.

Step 3: fixedly mounting the load-receiving test piece on the C axis component of the machine tool, such that an angle formed between the mounting face and the Y direction of the coordinate system of the machine tool is $\theta$, and an angle formed between the normal line of the load receiving face and the X direction of the coordinate system of the machine tool is $\alpha$; and adjusting the C axis component, such that the normal line of the load receiving face is consistent with the direction of the axis L of the ball seat.

Step 4: coordinating the Z axis component, the Y axis component and the X axis component, and moving the load-exerting component to a first load-exertion position of the load-receiving test piece which is preset, by means of a coordinating movement in the X, Y, and Z axes, such that the steel ball contacts with the load receiving face of the load-receiving test piece; exerting a simulated load to the load-receiving test piece through fine adjustment of the movement in the X, Y, and Z axes, detecting displacement at each location by each displacement sensor, detecting and obtaining the simulated load by the force sensor in the load-exerting component simultaneously, and deriving a stiffness value at the load-exertion position under the simulated load.

Step 5: then, re-coordinating the Z axis component, the Y axis component and the X axis component, and moving the load-exerting component to a next load-exertion position of the load-receiving test piece, by means of the movement in the X, Y, and Z axes, detecting and deriving another stiffness value at the new load-exertion position in the same manner, continuously changing the load-exertion position and repeating the above steps, and thus deriving a stiffness distribution under the desired simulated load.

Advantageous Effect

The advantageous effect of the present invention is in that: employment of the gear grinding machine with shaped grinding wheel enables automatic translocation-simulating loading and detection of static stiffness distribution, and the structure according to the present invention is simple and is easy to be operated.

REFERENCE NUMERALS IN THE DRAWINGS

Figure 1:
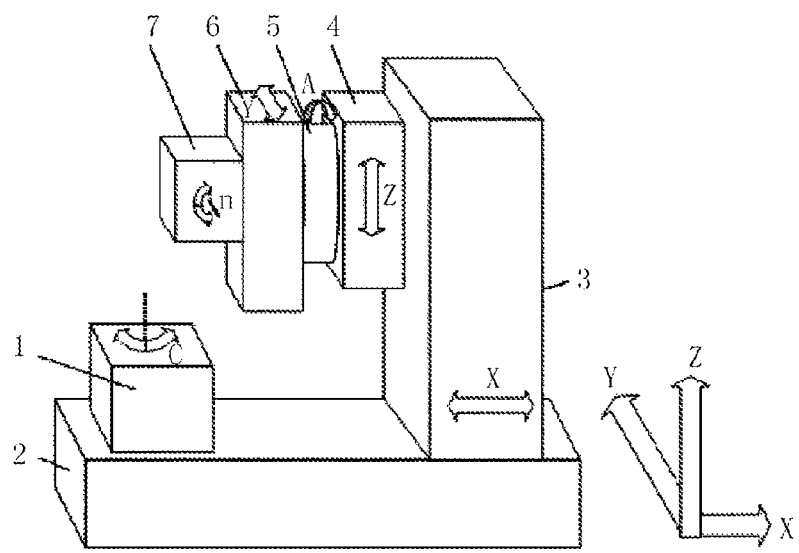
FIG. 1 is a schematic view of each moving direction of the apparatus according to the present invention.

1 C axis component
2 machine tool bed
3 X axis component
4 Z axis component
5 A axis component
6 Y axis component
7 spindle component
10 connector
11 gland
12 lower gasket
13 force sensor
14 upper gasket
15 ring body
16 position-limit cover
17 ball seat
18 ball cover
19 steel ball
20 diamond-shaped positioning pin
21 bearing cover
22 casing of a spindle box
23 front bearing of a spindle
24 spindle
25 load-receiving test piece L axis of the ball seat
a load receiving face of the load-receiving test piece
b mounting face of the load-receiving test piece

DETAILED DESCRIPTION

The present invention is described in detail below in connection with the detailed description and the attached drawings.

FIG. 1 is a structural schematic view of the gear grinding machine with shaped grinding wheel used in the apparatus according to the present invention. The gear grinding machine with shaped grinding wheel comprises a C axis component 1 and a X axis component 3 disposed on a machine tool bed 2, as well as a Z axis component 4, an A axis component 5, a Y axis component 6 and a spindle component 7 which are mounted sequentially towards a direction of the C axis component 1 in a horizontal mounting axis of an upper section of a column of the X axis component 3. The C axis component 1, the X axis component 3, the Z axis component 4, the A axis component 5 and the Y axis component 6 each includes a NC servo shaft and are connected with the NC device of the machine tool, respectively.

The function of each component is described as follows. X, Y and Z directions form a fixed coordinate system of the machine tool. The X axis component 3 enables horizontally linear cut-in movement leftward and rightward in the X direction, and the Z axis component 4 enables linear feed movement upward and downward in Z direction. The A axis component 5 drives the Y axis component 6 to enable a rotary adjustment movement A of the Y axis component 6 around the X axis. The Y axis component 6 drives the spindle component 7 to enable linear adjustment movement forward and backward in the Y axis. After the A axis component 5 is adjusted by an angle $\theta$ around the X axis, an angle formed between the Y axis of the Y axis component 6 and the Y direction of the coordinate system of the machine tool is $\theta$. The angle $\theta$ equals to a helix angle of a helical gear to be machined, and is 0 when machining a spur gear. Grinding wheel spindle in the spindle component 7 parallels to the Y axis of the Y axis component 6. The grinding wheel spindle enables a rotary movement n around the Y axis (which is a cutting movement, and does not involve surface formation). The C axis component 1 enables rotary dividing movement and rotary feed movement C of a work piece around the Z axis. Each of the movements in the Z, X, C, A and Y directions is performed by the NC servo shaft and driven by a servo motor. As load-carrying objects, an end-executor is a work bench in the C axis component 1 and the spindle component 7. The shaped grinding wheel is mounted on the spindle component 7 to enable movements in X, Z, A, Y and n axes. The work piece is mounted on the work bench (which is a part of the C axis component 1) to enable movement in the C axis. The cross-sectional shape of the shaped grinding wheel matches with that of the tooth space of the gear to be machined, and the cross-sectional shape of the shaped grinding wheel is reproduced onto the work piece through machining.

The present invention employs simulated load instead of machining load of the gear grinding machine with shaped grinding wheel, that is, a load-exerting component instead of the shaped grinding wheel is fixedly mounted on the machine tool spindle, and a load-receiving test piece instead of the gear work piece is fixedly mounted on the work bench in the C axis component 1.

Figure 2:
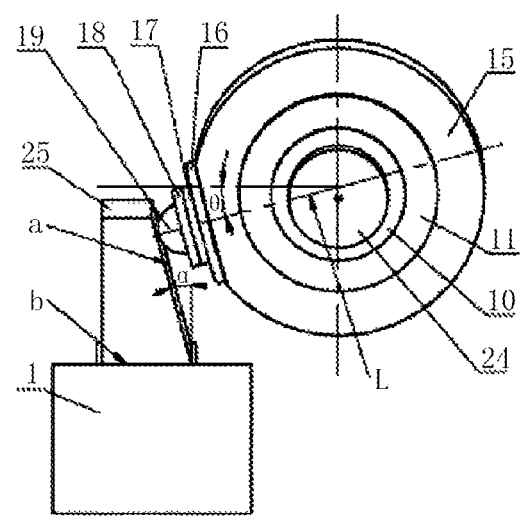
FIG. 2 is a partial structural schematic view of a load-exerting component and a load receiving face a of a load-receiving test piece in the apparatus according to the present invention.
Figure 3:
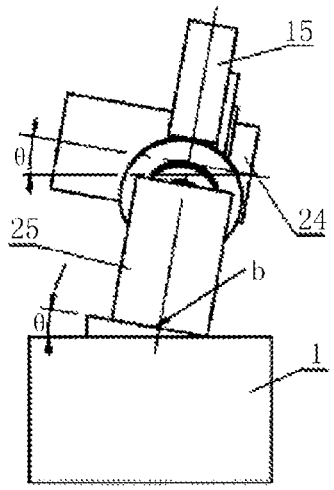
FIG. 3 is a partial structural schematic view of the load-exerting component and a mounting face b of the load-receiving test piece in the apparatus according to the present invention.
Figure 4:
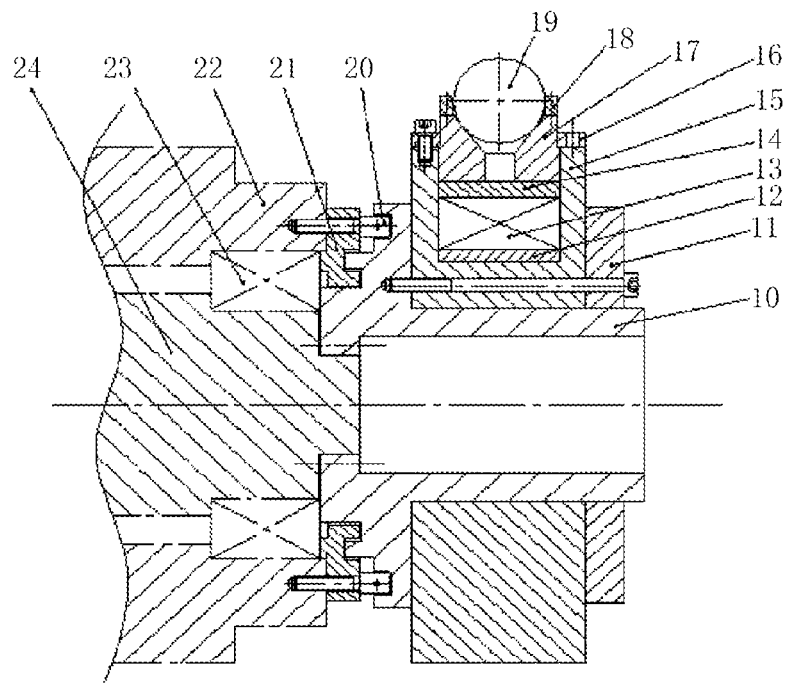
FIG. 4 is a schematic cross-sectional view of the load-exerting component in the apparatus according to the present invention.

Referring to FIGS. 2-4, the apparatus according to the present invention comprises the load-receiving test piece 25 disposed on the gear grinding machine with shaped grinding wheel and the load-exerting component for use in loading simulation. A load receiving face a and a mounting face b of the load-receiving test piece 25 are planes and an angle therebetween is (90°–$\alpha$). The mounting face b of the load-receiving test piece 25 is mounted on the work bench in the C axis component 1, an angle formed between the mounting face b and the Y direction of the coordinate system of the machine tool is $\theta$, and an angle formed between a normal line of the load receiving face a and the X direction of the coordinate system of the machine tool is $\alpha$. The structure of the load-exerting component is described as follows. A connector 10 is fixedly assembled on an outer circumference of a spindle 24 of the spindle component 7. A gland 11 and a ring body 15 are fitted coaxially on an outer circumference of the connector 10. The connector 10 is fixedly connected with the gland 11 and the ring body 15 through long bolts. A radial hole is disposed on the ring body 15, and a lower gasket 12, a force sensor 13, an upper gasket 14, a ball seat 17 and a steel ball 19 are sequentially disposed in the radial hole along a diameter direction outwardly. A position-limit cover 16 is disposed at a position in which an upper portion of the ball seat 17 contacts with the ring body 15, fixedly connected with the ring body 15, and limits the position of the ball seat 17. The steel ball 19 is positioned in the ball seat 17 and a ball cover 18, and exposed from the ball cover 18. The ball cover 18 is fixedly connected with the ball seat 17, and the ball seat 17 firmly fits the steel ball 19 via the ball cover 18.

A front bearing of spindle 23 is disposed between the spindle 24 and a casing of spindle box 22. A bearing cover 21 is mounted at an outside of the front bearing of spindle 23, and fixedly connected with the casing of spindle box 22 through a plurality of bolts. Two diamond-shaped positioning pins 20 are fixedly connected with the bearing cover 21 and the casing of spindle box 22 sequentially at one end thereof, and the two diamond-shaped positioning pins 20 match with a pin-hole of the connector 10 at the other end thereof. The connector 10 is oriented with respect to the spindle 24 through the two diamond-shaped positioning pins 20. The ball seat 17 is mounted such that an angle formed between the axis L of the ball seat 17 and the X axis of the Y axis component 6 is $\alpha$.

A detection method for static stiffness distribution according to the present invention uses the translocation-simulating loading apparatus for gear grinding machine with shaped grinding wheel described as above and is performed through the following steps.

Step 1: determining the angle $\alpha$ according to a proportion between the simulated grinding force in Z direction and the simulated grinding force in X direction; and determining the angle $\theta$ according to a proportion between the simulated grinding force in Z direction and the simulated grinding force in Y direction, wherein the angle $\theta$ is 0 when the machining of the spur gear is simulated.

Step 2: mounting the load-exerting component on the spindle 24 of the spindle component 7, and adjusting the A axis component 5 such that an angle formed between the Y axis of the Y axis component 6 and the Y direction of the coordinate system of the machine tool is $\theta$ (the X-coordinate direction of the Y axis component 6 remains to be consistent with the X-coordinate direction of the machine tool after such adjustment).

Step 3: fixedly mounting the load-receiving test piece 25 on the C axis component 1 of the machine tool, such that an angle formed between the mounting face b and the Y direction of the coordinate system of the machine tool is $\theta$, and an angle formed between the normal line of the load receiving face a and the X direction of the coordinate system of the machine tool is $\alpha$; and adjusting the C axis component 1, such that the normal line of the load receiving face a is consistent with the direction of the axis L of the ball seat 17.

Step 4: moving the load-exerting component to a first load-exertion position of the load-receiving test piece 25 which is preset, by means of a coordinating movement in the X, Y, and Z axes, such that the steel ball 19 contacts with the load receiving face of the load-receiving test piece 25; exerting a simulated load to the load-receiving test piece 25 through fine adjustment of the movement in the X, Y, and Z axes, detecting displacement at each location by each displacement sensor, detecting and obtaining the simulated load by the force sensor 13 in the load-exerting component simultaneously, wherein the detection data of the displacement sensors and the force sensor 13 is collected by the NC device of the machine tool, and deriving a stiffness value at the load-exertion position under the simulated load.

Step 5: then, moving the load-exerting component to a next load-exertion position of the load-receiving test piece 25, by means of the movement in the X, Y, and Z axes, detecting and deriving another stiffness value at the new load-exertion position in the same manner, continuously changing the load-exertion position and repeating the above steps, and thus deriving a stiffness distribution under the desired simulated load.

The invention claimed is:

1. A translocation-simulating loading apparatus for a gear grinding machine with a shaped grinding wheel, the apparatus comprising:
   a load-receiving test piece disposed on the gear grinding machine with the shaped grinding wheel and a load-exerting component for use in loading simulation;
   the gear grinding machine with the shaped grinding wheel comprising a C axis component and a X axis component disposed on a machine tool bed, as well as a Z axis component, an A axis component, a Y axis component and a spindle component which are mounted sequentially towards a direction of the C axis component in a horizontal mounting axis of an upper section of a column of the X axis component; and
   the load-exerting component comprising a connector, a gland and a ring body are fitted coaxially on an outer circumference of a spindle of the spindle component,
   wherein the connector is fixedly connected with the spindle, the connector is fixedly connected with the gland and the ring body, a radial hole is disposed on the ring body, and a lower gasket, a force sensor, an upper gasket, a ball seat and a steel ball are sequentially disposed in the radial hole along a diameter direction outwardly,
   wherein a position-limit cover is disposed at a position in which an upper portion of the ball seat contacts with the ring body and is fixedly connected with the ring body, and
   wherein the steel ball is positioned in the ball seat and a ball cover and is exposed from the ball cover, the ball cover is fixedly connected with the ball seat, and the ball seat is mounted such that an angle formed between the axis L of the ball seat and the X axis of the Y axis component is α; and
   a load receiving face and a mounting face of the load-receiving test piece being planes, wherein the mounting face of the load-receiving test piece is mounted on a work bench in the C axis component, an angle formed between the mounting face and a Y direction of a coordinate system of the machine tool is θ, and an angle formed between a normal line of the load receiving face and a X direction of the coordinate system of the machine tool is α.

2. The translocation-simulating loading apparatus for the gear grinding machine with the shaped grinding wheel of claim 1, wherein the translocation-simulating loading apparatus further comprises:
   a front bearing of spindle disposed between the spindle and a casing of spindle box; and
   a bearing cover mounted at an outside of the front bearing of spindle and fixedly connected with the casing of spindle box through a plurality of bolts, wherein the casing of spindle box and the bearing cover are fitted with a pin-hole of the connector through two diamond-shaped positioning pins.

3. The translocation-simulating loading apparatus for the gear grinding machine with the shaped grinding wheel of claim 2, wherein the translocation-simulating loading apparatus further comprises:
   a plurality of displacement sensors mounted on the spindle, the casing of spindle box and the C axis component, wherein detection data of the displacement sensors and the force sensor are collected by a numerically controlled (NC) device of the machine tool, and wherein each of the C axis component, the X axis component, the Z axis component, the A axis component and the Y axis component includes a NC servo shaft and is connected with the NC device of the machine tool, respectively.

4. A detection method for a static stiffness distribution using a translocation-simulating loading apparatus for a gear grinding machine with a shaped grinding wheel, wherein the translocation-simulating loading apparatus comprises,
   a load-receiving test piece disposed on the gear grinding machine with the shaped grinding wheel and a load-exerting component for use in loading simulation;
   the gear grinding machine with the shaped grinding wheel comprising a C axis component and a X axis component disposed on a machine tool bed, as well as a Z axis component, an A axis component, a Y axis component, and a spindle component which are mounted sequentially towards a direction of the C axis component in a horizontal mounting axis of an upper section of a column of the X axis component;
   the load-exerting component comprising:
      a connector, a gland and a ring body fitted coaxially on an outer circumference of a spindle of the spindle component,
      wherein the connector is fixedly connected with the spindle through bolts, and the connector is fixedly connected with the gland and the ring body through bolts, a radial hole is disposed on the ring body, and a lower gasket, a force sensor, an upper gasket, a ball seat and a steel ball are sequentially disposed in the radial hole along a diameter direction outwardly,
      wherein a position-limit cover is disposed at a position in which an upper portion of the ball seat contacts with the ring body and is fixedly connected with the ring body, and
      wherein the steel ball is positioned in the ball seat and a ball cover and is exposed from the ball cover, the ball cover is fixedly connected with the ball seat, and the ball seat is mounted such that an angle formed between the axis L of the ball seat and the X axis direction of the Y axis component is α; and
      a plurality of displacement sensors mounted on the spindle, a casing of spindle box and the C axis component;

a load receiving face and a mounting face of the load-receiving test piece being planes, wherein the mounting face of the load-receiving test piece is mounted on a work bench in the C axis component, an angle formed between the mounting face and a Y direction of a coordinate system of the machine tool is θ, and an angle formed between a normal line of the load receiving face and a X direction of the coordinate system of the machine tool is α, the detection method for the static stiffness distribution comprising the steps of:

a step 1: determining the angle α according to a proportion between the simulated grinding force in Z direction and the simulated grinding force in X direction; and determining the angle θ according to a proportion between the simulated grinding force in Z direction and the simulated grinding force in Y direction;

a step 2: mounting the load-exerting component on the spindle of the spindle component, and adjusting the A axis component such that an angle formed between the Y axis of the Y axis component and the Y direction of the coordinate system of the machine tool is θ;

a step 3: fixedly mounting the load-receiving test piece on the C axis component of the machine tool, such that an angle formed between the mounting face and the Y direction of the coordinate system of the machine tool is θ, and an angle formed between the normal line of the load receiving face and the X direction of the coordinate system of the machine tool is α; and adjusting the C axis component, such that the normal line of the load receiving face is consistent with the direction of the axis L of the ball seat;

a step 4: coordinating the Z axis component, the Y axis component and the X axis component, and moving the load-exerting component to a first load-exertion position of the load-receiving test piece which is preset, by means of a coordinating movement in the X, Y, and Z axes, such that the steel ball contacts with the load receiving face of the load-receiving test piece; exerting a simulated load to the load-receiving test piece through fine adjustment of the movement in the X, Y, and Z axes, detecting displacement at each location by each displacement sensor, detecting and obtaining the simulated load by the force sensor in the load-exerting component simultaneously, and deriving a stiffness value at the load-exertion position under the simulated load; and a step 5: re-coordinating the Z axis component, the Y axis component and the X axis component, and moving the load-exerting component to a next load-exertion position of the load-receiving test piece, by means of the movement in the X, Y, and Z axes, detecting and deriving another stiffness value at the new load-exertion position in the same manner, continuously changing the load-exertion position and repeating the above steps, and thus deriving a stiffness distribution under the desired simulated load.

5. The detection method for the static stiffness distribution of claim 4, wherein in the step 1, the angle θ is 0 when the machining of a spur gear is simulated.

6. The detection method for the static stiffness distribution of claim 4, wherein a front bearing of spindle is disposed between the spindle and the casing of spindle box, a bearing cover is mounted at an outside of the front bearing of spindle and is fixedly connected with the casing of spindle box through a plurality of bolts, and the casing of spindle box and the bearing cover are fitted with a pin-hole of the connector through two diamond-shaped positioning pins.

7. The detection method for the static stiffness distribution of claim 6, wherein a plurality of displacement sensors are mounted on the spindle, the casing of spindle box and the C axis component, detection data of the displacement sensors and the force sensor are collected by a numerically controlled device of the machine tool, and each of the C axis component, the X axis component, the Z axis component, the A axis component and the Y axis component includes a NC servo shaft and is connected with the NC device of the machine tool, respectively.

* * * * *